(12) United States Patent
Berthoud et al.

(10) Patent No.: US 9,815,923 B2
(45) Date of Patent: Nov. 14, 2017

(54) CATALYST SYSTEM (71) Applicant: ARLANXEO Netherlands B.V., Geleen (NL)

(72) Inventors: Alexandra Berthoud, Neerharen (BE); Victor Quiroga Norambuena, Lanaken (BE); Gerard Van Doremaele, Sittard (NL); Richard Thomas William Scott, Maastricht (NL)

(73) Assignee: ARLANXEO NETERLANDS, B.V. (NL)

( * ) Notice: Subject to any disclaimer, the term of this patent is extended or adjusted under 35 U.S.C. 154(b) by 0 days.

(21) Appl. No.: 15/027,707

(22) PCT Filed: Oct. 7, 2014

(86) PCT No.: PCT/EP2014/071438
§ 371 (c)(1),
(2) Date: Apr. 7, 2016

(87) PCT Pub. No.: WO2015/052184
PCT Pub. Date: Apr. 16, 2015

(65) Prior Publication Data
US 2016/0244543 A1 Aug. 25, 2016

(30) Foreign Application Priority Data
Oct. 7, 2013 (EP) .................................... 13187513

(51) Int. Cl.
| | |
|---|---|
| *C08F 4/76* | (2006.01) |
| *C08F 4/64* | (2006.01) |
| *C08F 4/52* | (2006.01) |
| *B01J 31/38* | (2006.01) |
| *C08F 210/06* | (2006.01) |
| *C08F 10/06* | (2006.01) |
| *C08F 210/02* | (2006.01) |
| *B01J 31/02* | (2006.01) |
| *B01J 31/14* | (2006.01) |
| *C08F 4/659* | (2006.01) |

(52) U.S. Cl.
CPC ............ *C08F 210/06* (2013.01); *C08F 10/06* (2013.01); *C08F 210/02* (2013.01); *B01J 31/0251* (2013.01); *B01J 31/146* (2013.01); *B01J 31/38* (2013.01); *C08F 4/65908* (2013.01); *C08F 2420/03* (2013.01)

(58) Field of Classification Search
CPC ...... C08F 4/69085; B01J 31/38; B01J 31/146; B01J 31/0251
See application file for complete search history.

(56) References Cited

U.S. PATENT DOCUMENTS

| | | | |
|---|---|---|---|
| 9,135,594 B2 * | 9/2015 | Cross ............... | G06Q 10/06312 |
| 9,315,594 B2 * | 4/2016 | Doremaele ............... | C08F 4/52 |
| 2006/0183631 A1 * | 8/2006 | Lee ........................ | C08F 210/16 502/117 |
| 2007/0043182 A1 * | 2/2007 | Martin .................. | C08F 210/16 526/119 |
| 2007/0197374 A1 * | 8/2007 | Yang ...................... | C08F 10/00 502/103 |
| 2010/0112211 A1 * | 5/2010 | Xu ......................... | C07C 211/65 427/248.1 |
| 2010/0209610 A1 * | 8/2010 | Cameron ................ | C07F 7/006 427/255.28 |
| 2011/0049512 A1 * | 3/2011 | Daniele ................. | C23C 16/308 257/43 |
| 2014/0249283 A1 * | 9/2014 | Doremaele ........... | C08F 4/6428 526/133 |
| 2015/0148505 A1 * | 5/2015 | Gross ..................... | B01J 31/122 526/189 |

FOREIGN PATENT DOCUMENTS

| | | | | |
|---|---|---|---|---|
| EP | 2508540 A1 | 10/2012 | | |
| FR | 2 928 663 A1 * | 9/2009 | ............. | C23C 16/34 |
| WO | WO 2011/054927 A1 * | 5/2011 | ............. | C08F 10/00 |
| WO | WO 2012/130921 A1 * | 10/2012 | ............. | C08F 10/02 |

OTHER PUBLICATIONS

International Search Report from co-pending Application PCT/EP/2014/071438 dated Apr. 12, 2014, 2 pages.

* cited by examiner

*Primary Examiner* — Rip A Lee (57) ABSTRACT

A catalyst system comprising
a) a metal complex of the formula $CyLMZ_p$, wherein
M is a group 4 metal
Z is an anionic ligand,
p is number of 1 to 2, preferably 2
Cy is a cyclopentadienyl-type ligand and,
L is a ligand of the formula

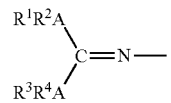

wherein each A is independently selected from the group consisting of nitrogen and phosphorus and $R^1$, $R^2$, and $R^4$ are independently selected from the group consisting of hydrogen, unsubstituted or substituted hydrocarbyl, unsubstituted or substituted silyl and unsubstituted or substituted germyl residues, and
b) a boron containing activator,
characterized in that the molar ratio of the boron of the activator to M of the metal complex is greater than 2.5.

17 Claims, 4 Drawing Sheets

Fig. 1

SEC-DV chromatogram example 1

Fig. 2

SEC-DV chromatogram example 2

Fig. 3

SEC-DV chromatogram example 3

Fig. 4

SEC-DV chromatogram example 4

CATALYST SYSTEM

CATALYST SYSTEM

The present invention relates to a catalyst system and a process for the preparation of a polymer using the same.

A process for the polymerization of at least one olefin having 2 to 8 carbon atoms in the presence of a polymerization catalyst component comprising a guanidine ligand, an activator, and optionally a scavenger is known from WO2011054927. WO2011054927 discloses a process for the copolymerization of ethylene and at least one additional alpha olefin having from 3 to 8 carbon atoms. Characterized in that said process employs a catalyst system for olefin polymerization comprising: an organometallic complex of a group 4 metal comprising a guanidine ligand, a cyclopentadienyl ligand (preferably substituted); and an activator.

The object of WO2011054927 was primarily to demonstrate, that contrary to the teaching concerning half-sandwich guanidinato catalysts, such catalysts could be very highly productive for olefin copolymerisation. Largely monomodal polymer were prepared using the process embodied in WO2011054927 with Mw/Mn values not greater than 3.5 (see example 5); B:Ti ratios were not higher than a maximum value of 2.

High molecular weight monomodal olefin copolymers result in materials with desirable strength and toughness. However, in spite of these advantageous properties, such polymers tend to suffer from poor processing characteristics. A bimodal molecular weight distribution can result in excellent polymer properties particularly if it is possible to control the relative fractions of high and low molecular weight components. Such a system is advantageous because it allows enhanced regulation of the mechanical properties of the polymer.

Many different strategies are known in the art for preparation of bimodal polymers such as utility of multiple reactors or use of a plurality of precatalysts/activators. Such methods result in complicated processes. In some cases a conventional activation of a precatalyst results in multimodal behaviour derived from the serendipitous generation of more than one active site. However, in such systems it is difficult to control the proportions of each of the molecular weight components.

The object of the invention is to provide a catalyst system to achieve such bimodal polymers.

DETAILS OF THE INVENTION

The invention provides a catalyst system comprising
a) a metal complex of the formula $CyLMZ_p$ of the formula (1),
wherein
M is a group 4 metal
Z is an anionic ligand,
p is number of 1 to 2, preferably 2,
Cy is a cyclopentadienyl-type ligand and,
L is a guanidinate ligand of the formula wherein each A is independently selected from the group consisting of nitrogen and phosphorus and $R^1$, $R^2$, $R^3$ and $R^4$ are independently selected from the group consisting of hydrogen, unsubstituted or substituted hydrocarbyl, unsubstituted or substituted silyl and unsubstituted or substituted germyl residues, and b) a boron containing activator,
characterized in that the molar ratio of the boron of the activator to M of the metal complex is greater than 2.5, in particular greater than 3, most preferred from 3.5 to 10.

For the avoidance of doubt the term "system" according to the present invention may be understood to cover a mixture of the components a) and b) and optionally further ingredients as well as the sequential use of its ingredients in the polymerization process.

M

In a preferred embodiment the metal M of group 4 is titanium (Ti), zirconium (Zr) or hafnium (Hf), most preferably titanium.

Cy

A preferred cyclopentadienyl-type ligand is mono or polysubstituted wherein the substituents are selected from the group consisting of halogen, substituted or unsubstituted hydrocarbyl, substituted or unsubstituted hydrocarbyloxy, substituted or unsubstituted silyl and substituted or unsubstituted germyl residues as well as amido and phosphide radicals. Possible substituents are halogen, amido, phosphido, alkoxy, or aryloxy residues. As used herein, the term substituted cyclopentadienyl-type ligand is meant to broadly convey its conventional meaning, namely a substituted ligand having a five-membered carbon ring which is bonded to the metal via a π-type bonding usually in adopting $\eta^5$-coordination to the metal.

Thus, the term cyclopentadienyl-type includes cyclopentadienyl, indenyl and fluorenyl. The term mono- or polysubstituded refers to the fact that one or more aromatic hydrogen atoms of the cyclopentadienyl-type structure have been replaced by one or more other residues. The number of substituents is between 1 and 5 for the cyclopentadienyl ligand, 1 to 7 for the indenyl ligand and 1 to 9 for the fluorenyl ligand.

An exemplary list of substituents for a cyclopentadienyl ligand includes the following groups. For halogen F, Cl and Br may be mentioned.

For substituted or unsubstituted hydrocarbyl radicals are preferred including $C_1$-$C_{20}$ linear and branched alkyl radicals such as methyl, ethyl, propyl, butyl, pentyl, hexyl, heptyl, octyl, nonyl, and decyl, $C_1$-$C_{20}$ hydrocarbyl-substituted and unsubstituted cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl; $C_1$-$C_{20}$ hydrocarbyl-substituted and unsubstituted aryl radicals including phenyl, methylphenyl, trimethylphenyl, cyclohexylphenyl, napthyl, butylphenyl, butyldimethylphenyl; C1-20 substituted hydrocarbyl radicals including benzyl, N,N-dimethylaminobenzyl, N,N-dimethylaminomethyl, methoxymethyl, diphenylphosphinomethyl, fluorophenyl, trifluoromethylphenyl, fluoromethyl and cyanoethyl.

The preferred substituted or unsubstituted silyl and substituted or unsubstituted germyl residues include Si—$(R^8)_3$ wherein each $R^6$ is selected from the group consisting of hydrogen, $C_{1-8}$ alkyl or alkoxy radical, $C_{8-10}$ aryl or aryloxy, in particular tris(trifluoromethyl)silyl or tris(perfluorophenyl)silyl, and germyl radicals of the formula —Ge—$(R^7)_3$ wherein each $R^7$ is selected from the group consisting of hydrogen, $C_{1-8}$ alkyl or alkoxy radical, $_{6-10}$ aryl or aryloxy radical like tris(trifluoromethyl)germyl, or tris(perfluorophenyl)germyl.

The preferred substituted or unsubstituted hydrocarbyloxy radicals include methoxy, ethoxy, butoxy, phenoxy, methylthio, ethylthio and phenylthio.

The preferred amido and phosphido radicals include an amido which is unsubstituted or substituted by up to two $C_{1-8}$ alkyl radicals, and a phosphido radical which is unsubstituted or substituted by up to two $C_{1-8}$ alkyl radicals.

In a preferred embodiment the cyclopentadienyl ligand is penta substituted by methyl groups and in consequence Cy is 1,2,3,4,5-pentamethyl-cyclopentadienyl, $C_5Me_5$, commonly referred to as Cp*. Also preferred ligands Cy are other unsubstituted or substituted cyclopentadienyl groups, substituted or unsubstituted indenyl groups, substituted or unsubstituted fluorenyl groups, substituted or unsubstituted tetrahydroindenyl groups, substituted or unsubstituted tetrahydrofluorenyl groups, substituted or unsubstituted octahydrofluorenyl groups, substituted or unsubstituted benzoindenyl groups, substituted or unsubstituted heterocyclopentadienyl groups, substituted or unsubstituted heteroindenyl groups, substituted or unsubstituted heterofluorenyl groups, or their isomers.

Z

In a preferred embodiment Z means a halogen atom, a $C_{1-10}$ alkyl group, a $C_{1-10}$ aralkyl group, a $C_{6-20}$ aryl group or a $C_{1-20}$ hydrocarbon-substituted amino group, and more preferably, a halogen atom and a $C_{1-10}$ hydrocarbon-substituted amino group, most preferably Cl, F, Br, methyl, benzyl, methyltrimethylsilyl, phenyl, methoxyphenyl, dimethoxyphenyl, N,N-dimethylaminophenyl, bis-(N,N-dimethylamino)phenyl, fluorophenyl, difluorophenyl, trifluorophenyl, tetrafluorophenyl, perfluorophenyl, trialkylsilylphenyl, bis(trialkylsilyl)phenyl and tris(trialkylsilyl)phenyl. Most preferred are Cl or methyl. In case of more than one Z the given meanings are independent.

L

In a preferred embodiment the guanidate ligand is preferred wherein A is nitrogen. The possible substituents of the substituted radicals $R^1$, $R^2$, $R^3$ and $R^4$ are one or more halogen, amido, phosphido, alkoxy, or aryloxy radicals. Furthermore the radicals $R^1$, $R^2$, $R^3$ and $R^4$ preferably are independently selected from the group consisting of hydrogen and hydrocarbyl, in particular $C_1$-$C_4$. Most preferably $R^1$, $R^2$, $R^3$ and $R^4$ are independently from another $C_1$-$C_4$-alkyl, in particular methyl. In a preferred embodiment the catalyst system according to the present invention contains a metal complex of formula (1), wherein M is Ti,
Z is selected from the group consisting of chlorine and $C_1$-$C_4$-alkyl,
p is 2
Cy is a pentamethylcyclopentadienyl-type ligand and,
L means 1,1,3,3-tetramethylguanidate.

The metal complex of the formula (1) may also be used as a supported catalyst which comprises a organometallic compound of formula (1), a supporting material and optionally the activator and/or a scavenger.

A supporting material is defined as an inorganic or organic compound that does not dissolve in the inert hydrocarbon solvent in which the process of the invention is carried out. Suitable inorganic supports include silica, magnesium halides, such as $MgF_2$, $MgCl_2$, $MgBr_2$, $MgI_2$, zeolites, and alumina. Suitable organic supports include polymers. Some non-limiting examples of polymeric supports are polyolefins such as polystryrene, polypropylene and polyethylene, polycondensates such as polyamides and polyesters and combinations thereof.

Boron Containing Activator

The preferred activator is a borane and/or a borate. Particular preference is given to boron containing activators selected from the group consisting of (C1) A boron compound represented by the general formula $BQ_1Q_2Q_3$ (C2) A boron compound represented by the general formula $G(BQ_1Q_2Q_3Q_4)$ and (C3) A boron compound represented by the general formula $(J-H)(BQ_1Q_2Q_3Q_4)$ wherein, B is a boron atom in the trivalent valence state, $Q_1$ to $Q_3$ have the same meaning as already mentioned above and $Q_4$ has the same meaning as one of the radicals to $Q_3$ and $Q_1$ to $Q_4$ may be the same or different. G is an inorganic or organic cation, J is a neutral Lewis base, and (J-H) is a Bronsted acid.

In the boron compound (C1) represented by the general formula $BQ_1Q_2Q_3$, B is a boron atom in the trivalent valence state, $Q_1$ to $Q_3$ have the above mentioned meanings and may be the same or different.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenyl-bis(pentafluoro- phenyl)borane and the like, and tris(pentafluorophenyl)borane is most preferable.

In the boron compound (C2) represented by the general formula $G(BQ_1Q_2Q_3Q_4)$, $G^+$ is an inorganic or organic cation, B is a boron atom in the trivalent valence state, and $Q_1$ to $Q_4$ are as defined for $Q_1$ to $Q_3$ in the above-mentioned (C1).

Specific examples of the inorganic cation G in a compound represented by the general formula $G(BQ_1Q_2Q_3Q_4)$ include a ferrocenium cation, alkyl-substituted ferrocenium cation, silver cation and the like, specific examples of the organic cation G thereof include a triphenylmethyl cation and the like. G is preferably a carbenium cation, and particularly preferably a triphenylmethyl cation.

Examples of (B $Q_1Q_2Q_3Q_4$) include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, teterakis(2,3,4-trifluorophenyl)borate, phenyltris(pentafluoro-phenyl) borate, tetrakis(3,5-bistrifluoromethylphenyl)borate and the like.

As specific combination of them, ferroceniumtetrakis (pentafluorophenyl)borate, 1,1'-dimethylferroceniumtetrakis(pentafluorophenyl)borate, silvertetrakis(pentafluorophenyl)borate, triphenylmethyltetrakis-(pentafluorophenyl) borate, triphenylmethyl-tetrakis(3,5-bistrifluoromethylphenyl)borate and the like are listed, and triphenylmethyltetrakis(pentafluorophenyl)borate is most preferable.

In the boron compound (C3) represented by the general formula (J-H) $Q^+(BQ_1Q_2Q_3Q_4)$, J is a neutral Lewis base, (J-H) is a Bronsted acid, B is a boron atom in the trivalent valence state, and $Q_1$ to $Q_4$ are as defined for $Q_1$ to $Q_4$ in the above-mentioned Lewis acid (C1).

Specific examples of the Bronsted acid (J-H)⁺ in a compound represented by the general formula (J-H) $(BQ_1Q_2Q_3Q_4)$ include a trialkyl-substituted ammonium, N,N-dialkylanilinium, dialkylammonium, triaryl phosphonium and the like, and as the (B $Q_1Q_2Q_3Q_4$), the same compounds as described above are listed. As specific combination of them, there are listed triethylammoniumtetrakis (pentafluoro-phenyl)-borate, tripropylammoniumtetrakis (pentafluorophenyl)borate, tri(n-butyl)ammonium-tetrakis (pentafluorophenyl)borate, tri(n-butyl)ammoniumtetrakis(3, 5-bistrifluoromethyl-phenyl)borate, N,N-dimethyl-aniliniumtetrakis(pentafluoro-phenyl)borate, N,N-diethylaniliniumtetrakis(penta-fluorophenyl)borate, N,N-2, 4,6-pentamethylanilinium-tetrakis(pentafluorophenyl) borate, N,N-dimethylanilinium-tetrakis(3,5-bistrifluoromethyl-phenyl)borate, diisopropyl-ammoniumtetrakis(penta-fluorophenyl)borate, dicyclohexyl-ammoniumtetrakis-(pentafluorophenyl)borate, triphenylphosphoniumtetrakis(penta-fluorophenyl)borate, tri(methylphenyl)phosphoniumtetrakis(pentafluorophenyl)borate, tri(dimethylphenyl)-phosphonium-tetrakis (pentafluorophenyl)borate and the like, and tri(n-butyl) ammonium-tetrakis(pentafluorophenyl)borate or N,N-dimethylaniliniumtetra-kis(pentafluoro-phenyl)borate is most preferable.

Preferably the boron containing activator is selected from the group consisting of triphenylmethyl-tetrakis(pentafluorophenyl)borate, triphenylmethyl-tetrakis(2,3,5,6-tetrafluorophenyl)borate, triphenylmethyl-tetrakis(2,3,4,5-tetrafluorophenyl)borate, triphenylmethyl-tetrakis(3,4,5-trifluorophenyl)borate, triphenylmethyl-teterakis(2,3,4-trifluorophenyl)borate, triphenylmethyl-phenyltris (pentafluoro-phenyl) borate and triphenyl-methyl-tetrakis(3, 5-bistrifluoromethylphenyl)borate. Most preferably triphenyl-methyltetrakis(pentafluorophenyl)borate.

Scavenger

The catalyst system of the present invention may also contain in addition scavengers as well as other non-boron containing activators.

A scavenger is a compound that reacts with impurities present in the process of the invention, which are poisonous to the catalyst.

In a preferred embodiment of the present invention the scavenger b) as of the catalyst system is a hydrocarbyl of a metal or metalloid of group 1-13 or its reaction products with at least one sterically hindered compound containing a group 15 or 16 atom.

Preferably, the group 15 or 16 atom of the sterically hindered compound bears a proton. Examples of these sterically hindered compounds are tert-butanol, iso-propanol, triphenylcarbinol, 2,6-di-tert-butylphenol, 4-methyl-2, 6-di-tert-butylphenol, 4-ethyl-2,6-di-tert-butylphenol, 2,6-di-tert-butylanilin, 4-methyl-2,6-di-tert-butylanilin, 4-ethyl-2,6-di-tert-butylanilin, HMDS (hexamethyldisilazane), diisopropylamine, d-tert-butylamine, diphenylamine and the like. Some non-limiting examples of scavengers are butyl-lithium including its isomers, dihydrocarbylmagnesium, and hydrocarbylzinc and their reaction products with a sterically hindered compound or an acid, such as HF, HCl, HBr, HI. Furthermore organoaluminium compounds (E) as defined below can be used as Scavenger b), in particular hydrocarbylaluminoxanes like triisobutylaluminium (TIBA).

Preferred other activators may be organoaluminium compounds, preferably the compound (E) as will be defined hereinafter, which may also be used as scavenger.

The organoaluminum compound (E) is an aluminum compound having a carbon-aluminum bond, and one or more of aluminum compounds selected from the following (E1) to (E3) are preferable.

(E1) An organoaluminum compound represented by the general formula $T^1_a AlZ_{3-a}$ (E2) A cyclic aluminoxane having a structure represented by the general formula $\{-Al(T^2)-O-\}_b$ (E3) Linear aluminoxane having a structure represented by the general formula $T^3\{-Al(T^3)-O-\}_D AlT^3_2$ (wherein, each of $T^1$, $T^2$ and $T^3$ is hydrocarbon group, and all $T^1$, all $T^2$ and all $T^3$ may be the same or different respectively. Z represents a hydrogen atom or halogen atom, and all Z's may be the same or different, 'a' represents a number satisfying $0<a\leq3$, 'b' is an integer of 2 or more, and 'c' is an integer of 1 or more).

The hydrocarbon group in E1, E2 or E3 is preferably a hydrocarbon group having 1 to 8 carbon atoms, and more preferably an alkyl group.

Specific examples of the organoaluminum compound (E1) represented by the general formula $T^1_a AlZ_{3-a}$ include trialkylaluminums such as trimethylaluminum, triethyl-aluminum, tripropylaluminum, triisobutylaluminum, trihexyl-aluminum and the like; dialkylaluminum chlorides such as dimethylaluminum chloride, diethylaluminum chloride, dipropylaluminum chloride, diisobutylaluminum chloride, dihexylaluminum chloride and the like; alkylaluminum dichlorides such as methylaluminum dichloride, ethylaluminum dichloride, propylaluminum dichloride, isobutylaluminum dichloride, hexylaluminum dichloride and the like; dialkylaluminum hydrides such as dimethylaluminum hydride, diethylaluminum hydride, dipropylaluminum hydride, diisobutylaluminum hydride, dihexylaluminum hydride and the like; and so forth.

The trialkylaluminum is preferable, and triethylaluminum or triisobutylaluminum is more preferable.

Specific examples of cyclic aluminoxane E2 having a structure represented by the general formula $\{-Al(T^2)-O-\}_b$ and the linear aluminoxane E3 having a structure represented by the general formula $T^3\{-Al(T^3)-O-\}_D AlT^3_2$ include alkyl groups such as a methyl group, ethyl group, n-propyl group, isopropyl group, n-butyl group, isobutyl group, n-pentyl group, neopentyl group and the like, b is an integer of 2 or more, c is an integer of 1 or more. Preferably, $T^2$ and $T^3$ represent a methyl group or isobutyl group, and b is 2 to 40 and c is 1 to 40.

The above-described aluminoxane is made by various methods. This method is not particularly restricted, and the aluminoxane may be produced according to a known method. For example, a solution prepared by dissolving a trialkylaluminum (for example, trimethylaluminum and the like) in a suitable organic solvent (benzene, an allphatic hydrocarbon or the like) is allowed to contact with water to produce aluminoxane. Further, there is exemplified a method in which la trialkylaluminum (for example, trimethylaluminum and the like) is allowed to contact with a metal salt containing crystal water (for example, copper sulfate hydrate and the like) to produce aluminoxane.

The molar ratio of metal complex (1) : scavenger employed preferably ranges from 0.1:1000 to 0.1:10, more preferably ranges from 0.1:1000 to 0.1:300, and most preferably from 0.1:500 to 0.6:500.

Process

The invention further provides a process for the polymerization of a polymer by polymerizing at least one polymerizable monomer comprising contacting said monomer with a catalyst system according to the present invention.

The surprising advantage of the catalyst system of the present invention is that simply by changing the ratio of the organometallic component to the activator, the fractions of higher and lower molecular weight components can be tuned. Further advantages are the unexpected increase in both productivity and comonomer affinity with higher ratios of activator to organometallic component.

Polymer

In a preferred embodiment the polymer to be made according to the process of the present invention has a molecular weight distribution (polydispersity index or Mw/Mn or PDI) from greater 3.5, in particular from 3.6 to 35.

The polymer preferably does have an intrinsic viscosity of 1.0 to 12 dl/g. More preferably from 3.0 to 10 dl/g. Most preferably from 4.0 to 8.5 dl/g.

The polymer preferably does have an average molecular weight (Mw) in the range of 150 to 1500 kgmo$^{-1}$, more preferably from 300 to 1200 kgmol$^{-1}$. Most preferably from 200 to 1000 kgmol$^{-1}$.

Preferably the polymer according to the present invention is bimodal having a high molecular weight polymer component and a low molecular weight polymer component. The polymer preferably has a "split" preferably ranging from 65 wt. % to 30 wt. %; most preferably ranging from 60 wt. % to 30 wt. % high molecular weight polymer component in the bimodal polymer. The term "split" refers to the weight percent (wt %) of the high molecular weight polymer component in the bimodal polymer. Thus, it describes the relative amount of the high molecular weight component against the low molecular weight component in a bimodal polymer composition. The weight percent (wt %) of each component can also be represented by the area of each molecular weight distribution curve that is seen after deconvolution of the overall molecular weight distribution curve.

A preferred method of deconvolution uses a simple procedure which approximates the gel permeation chromatogram as a sum of normal distributions of the form:

$$y=((A*\exp((-0.5)*(((x-B)/C)^2)))+(D*\exp((-0.5)*(((x-E)/F)^2))))$$

Where A, B, C, D, E and F are fitting parameters. The fitting is done computationally using a non-linear regression employing an arbitrary merit function. The parameter values are adjusted such that the merit function is minimized. A commercially available program such as XLFit5 from IDBS Software may be used to carry out the minimization.

Preferably the maximum (peak) of the molecular weight (Mp) of the lower molecular weight mode preferably lies in the range 50 to 150 kgmol$^{-1}$; more preferably in the range 70 to 100 kgmol$^{-1}$. The peak molecular weight (Mp) of the higher molecular weight mode preferably lies in the range 500 to 1500 kgmol$^{-1}$; more preferably in the range 700 to 1300 kgmol$^{-1}$.

Polymerization

The preferred process for polymerization is generally concluded by consulting at least one olefinic monomer with the metal complex of the formula (1) or the catalyst system according to the present invention in the gas phase, in slurry, or in solution in an inert solvent preferable a hydrocarbon solvent. Suitable solvents are in the gas phase, in slurry, or in solution in an inert solvent preferable a hydrocarbon solvent. Suitable solvents are a $C_{5-12}$ hydrocarbon such as pentane, hexane, heptane, octane, isomers and mixtures thereof, cyclohexane, methylcyclohexane, pentamethyl heptane and hydrogenated naphtha. The process of the invention may be conducted at temperatures from 10 to 250° C., depending on the product being made.

Monomer Definition

An olefinic monomer is understood to be a molecule containing at least one polymerizable double bond.

Suitable olefinic monomers are $C_{2-20}$ olefins. Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, and $C_{4-12}$ straight chained or cyclic hydrocarbyl radicals which are unsubstituted or substituted by a $C_{1-4}$ alkyl radical. Illustrative non-limiting examples of such a-olefins are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hepta-decene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These a-olefins may be used in combination.

The monomer may also be a polyene comprising at least two double bonds. The double bonds may be conjugated or non-conjugated in chains, ring systems or combinations thereof, and they may be endocyclic and/or exocyclic and may have different amounts and types of substituents. This means that the polyene may comprise at least one aliphatic, alicyclic or aromatic group, or combinations thereof.

Suitable polyenes include aliphatic polyenes and alicyclic polyenes. More specifically, aliphatic polyenes can be mentioned, such as 1,4-hexadiene, 3-methyl-1,4-hexadiene, 4-methyl-1,4-hexadiene, 5-methyl-1,4-hexadiene, 4-ethyl-1,4-hexadiene, 1,5-hexadiene, 3-methyl-1,5-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 1,8-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 1,9-decadiene, 1,5,9-decatriene, 6-methyl-1,6-undecadiene, 9-methyl-1,8-undecadiene and 1,13-tetradecadiene, 1,3-butadiene, isoprene.

Alicyclic polyenes may consist of at least one cyclic fragment. Examples of these alicyclic polyenes are vinylcyclohexene, vinylnorbornene, ethylidene norbornene, dicyclopentadiene, cyclooctadiene, 2,5-norbornadiene, 1,4-divinylcyclohexane, 1,3-divinylcyclohexane, 1,3-divinylcyclopentane, 1,5-divinylcyclooctane, 1-allyl-4-vinylcyclo-hexane, 1,4-diallylcyclohexane, 1-allyl-5-vinylcycloocatane, 1,5-diallylcyclooctane, 1-allyl-4-isopropenylcyclohexane, 1-isopropenyl-4-vinylcyclohexane and 1-isopropenyl-3-vinylcyclopentane, and 1,4-cyclohexadiene. Preferred polyenes are polyenes having at least one endocyclic double bond and optionally at least one exocyclic double bond, such as 5-methylene-2-norbornene and 5-ethylidene-2-norbornene, 5-vinylnorbornene, and 2,5-norbornadiene, dicyclopentadiene and vinylcyclohexene.

Examples of aromatic polyenes are divinylbenzene (including its isomers), trivinyl-benzene (including its isomers) and vinylisopropenylbenzene (including its isomers).

All of the above-mentioned monomers may be further substituted with at least one group comprising a heteroatom of group 13-17, or combinations thereof.

Homopolymers, copolymers and copolymers on the basis of 3 or more of the above-mentioned olefinic monomers and also blends thereof can be prepared with the process of the present invention.

In a preferred embodiment copolymers on the basis of ethylene, at least one $C_{3-12}$ alpha olefin, preferably propylene and at least one non-conjugated diene, preferably a diene selected from the group consisting of 5-methylene-2-norbornene 5-ethylidene-2-norbornene, 5-vinylnorbornene, 2,5-norbornadiene, dicyclopentadiene and vinylcyclohexene, preferably from the group consisting of 5-ethylidene-2-norbornene and 5-vinylnorbornene are made with catalyst system of the present invention.

The invention further relates to polymers obtainable with the catalyst system of the present invention. Below, the invention will be elucidated on the basis of the following examples and comparative experiments, without being limited thereto.

EXAMPLES

Test Methods.
Size Exclusion Chromatography (SEC) coupled to Refractive Index (RI) and Differential Viscometry (DV) detection. (SEC-DV)
Equipment: PL220 (Polymer Laboratories) SEC with PL220 DRI
  concentration detector and
  Viscotek 220R viscometry detector.
  Detectors are operated in parallel configuration.
  Degasser: PL-DG 802
Data processing: Viscotek data processing software, TriSEC 2.7 or higher version
Columns: PLgel Olexis (4x)
Calibration: Universal calibration with linear polyethylene (PE) standard (molecular weight 0.4-4000 kg/mol)
Temperature: 160° C.
Flow: 1.0 ml/min
Injection volume: 0.300 ml
Solvent/eluent: Distilled 1,2,4-trichlorobenzene with about 1 g/l of Ionol stabilizer
Sample preparation: Dissolving for 4 hours at approx. 150° C.
  Filtration through 1.2 micron Ag filter
  Sample concentration approx. 1.0 mg/ml
  Intrinsic Viscosity (IV) was measured at 135° C. in decahydronaphtalen as solvent.
Deconvolution of the bimodal GPC chromatograms allowed the wt. fractions of the higher and lower molecular weight components to be measured. Fourier transformation infrared spectroscopy (FT-IR), was used to determine the composition of the copolymers according to the method that is known in the art. The FT-IR measurement gives the composition of the various monomers in weight per cents relative to the total composition. Intrinsic Viscosity measurements were carried out with a Ubbelohde viscometer using decaline solutions of the copolymers dissolved during 16 hours.

The batch co-polymerizations were carried out in a 2-liter batch autoclave equipped with a double intermig and baffles. The reaction temperature was set on 90+/−3° C. and controlled by a Lauda Thermostat. The feed streams (solvents and monomers) were purified by contacting with various adsorption media to remove catalyst killing impurities such as water, oxygen and polar compounds as is known to those skilled in the art. During polymerisation the ethylene and propylene monomers were continuously fed to the gas cap of the reactor. The pressure of the reactor was kept constant by a back-pressure valve.

In an inert atmosphere of nitrogen, the reactor was filled with pentamethylheptanes (PMH) (950 mL), TIBA (Chemtura, 20 wt % Al in hexanes diluted to 0.1 M) or (example 5) MAO (Chemtura, 10 wt. % Al in toluene diluted to 0.10 M), and BHT (SigmaAldrich 0.2 M in hexanes). The reactor was heated to 90° C., while stirring at 1350 rpm. The reactor was pressurized to 7 bar and conditioned under a determined ratio of ethylene, propylene. After 15 minutes, $(C_5Me_5)Ti(NC(NMe_2)Cl_2$ was added into the reactor and the catalyst vessel was rinsed with PMH (50 mL) subsequently. $[CPh_3][B(C_6F_5)4_4]$ (TBF20) was added directly after the precatalyst was added. After 10 minutes of polymerisation, the monomer flow was stopped and the solution was carefully dumped in an Erlenmeyer flask of 2 L, containing a solution of Irganox-1076 in iso-propanol and dried over night at 100° C. under reduced pressure. The polymers were analysed for intrinsic viscosity (IV), for molecular weight distribution (SEC-DV) and composition (FT-IR).

The experimental results are given in table 1.

The results show that as the [B]:[Ti] ratio increases, the productivity increases and the propylene incorporation increases. The polymer produced in example 1 is monomodal with a narrow molecular weight distribution (as judged from the Mw/Mn value). As the [B]:[Ti] ratio increases from 1 to 2, a lower molecular weight component is observed which increases the Mw/Mn. Further increasing of the [B]:[Ti] ratio results in proportionally more of this lower molecular weight component and even greater Mw/Mn values. Example 5 shows that a very similar polymer is obtained when a B:Ti ratio of 2 and MAO/BHT scavenger system are employed as exemplified (Example 4) in WO2011054927. This shows that changing the scavenger system does not influence the bimodality of the polymer.

On increasing the B:Ti ratio to values greater than 2, the polymer produced has two major components (bimodal) and the Mw/Mn values become larger (>3.5) reflecting the presence of a bigger quantities of a lower molecular weight component.

| Example | Loading/ μmol | B:Ti | Yield (g) | Productiv./ ppm Ti | Incorporated C2 (wt %) | IV (dl/g) | Mw (kg/mol) | Mz (kg/mol) | Mw/Mn | Mp (lower molecular weight mode) | Mp (higher molecular weight mode) | Wt. fraction of higher Mw component[1] |
|---|---|---|---|---|---|---|---|---|---|---|---|---|
| 1 | 0.5 | 1 | 6.5 | 3.7 | 52.0 | 10.9 | 1160 | 1920 | 2.1 | — | 1000 | 100 |
| 2 | 0.5 | 2 | 8.5 | 2.8 | 47.0 | 9.1 | 980 | 1640 | 3.0 | n.d. | 950 | 76 |

-continued

| Example | Loading/ μmol | B:Ti | Yield (g) | Productiv./ ppm Ti | Incorporated C2 (wt %) | IV (dl/g) | Mw (kg/mol) | Mz (kg/mol) | Mw/ Mn | Mp (lower molecular weight mode) | Mp (higher molecular weight mode) | Wt. fraction of higher Mw component[1] |
|---|---|---|---|---|---|---|---|---|---|---|---|---|
| 3 | 0.2 | 5 | 5.9 | 1.6 | 40.0 | 4.9 | 480 | 1200 | 6.2 | 80 | 800 | 42 |
| 4 | 0.14 | 5.7 | 9.7 | 0.70 | 39.8 | 5.1 | 570 | 1700 | 6.9 | 90 | 1150 | 37 |

[1] The amount in wt % of the higher Mw component was determined by deconvolution using a commercially available program such as XLFit5 from IDBS Software Comparative example using identical conditions as in Example 4 of WO2011054927.

Scavenger System: MAO/BHT

| Example | Loading/ μmol | B:Ti | Yield (g) | Productivity/ ppm Ti | Incorporated C2 (wt %) | IV (dl/g) | Mw (kg/mol) | Mz (kg/mol) | Mw/ Mn | Mp (lower molecular weight mode) | Mp (higher molecular weight mode) | Wt. fraction of higher Mw component[1] |
|---|---|---|---|---|---|---|---|---|---|---|---|---|
| 5 | 0.2 | 2 | 6.61 | 1.45 | 48.7 | 9.1 | 1100 | 2000 | 3.2 | n.d. | 1100 | 70 |

[1] The amount in wt % of the higher Mw component was determined by deconvolution using a commercially available program such as XLFit5 from IDBS Software Figures

Figure 1:
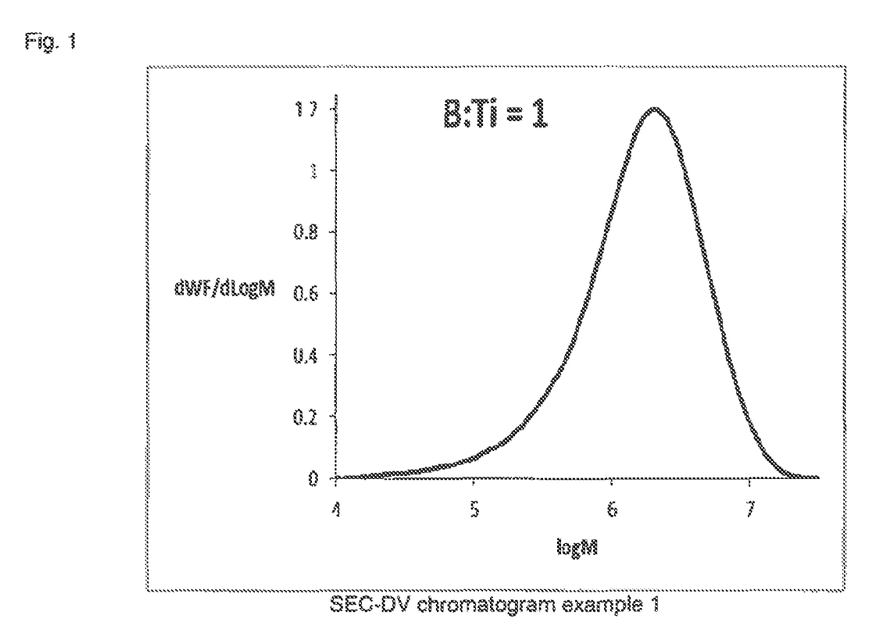
FIG. 1 to 4: SEC-DV chromatograms of example 1 to 4 respectively
Figure 2:
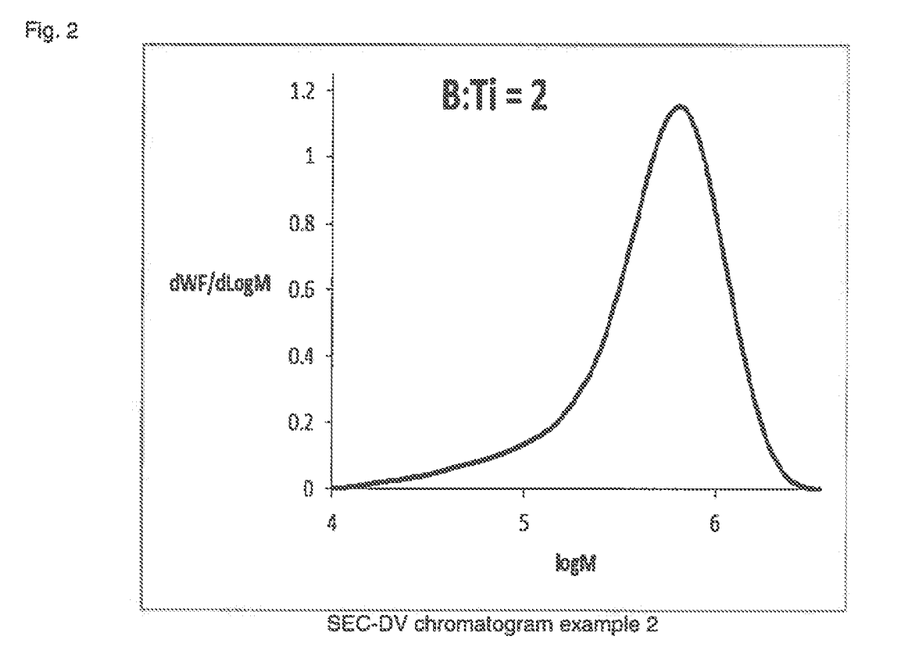
Figure 3:
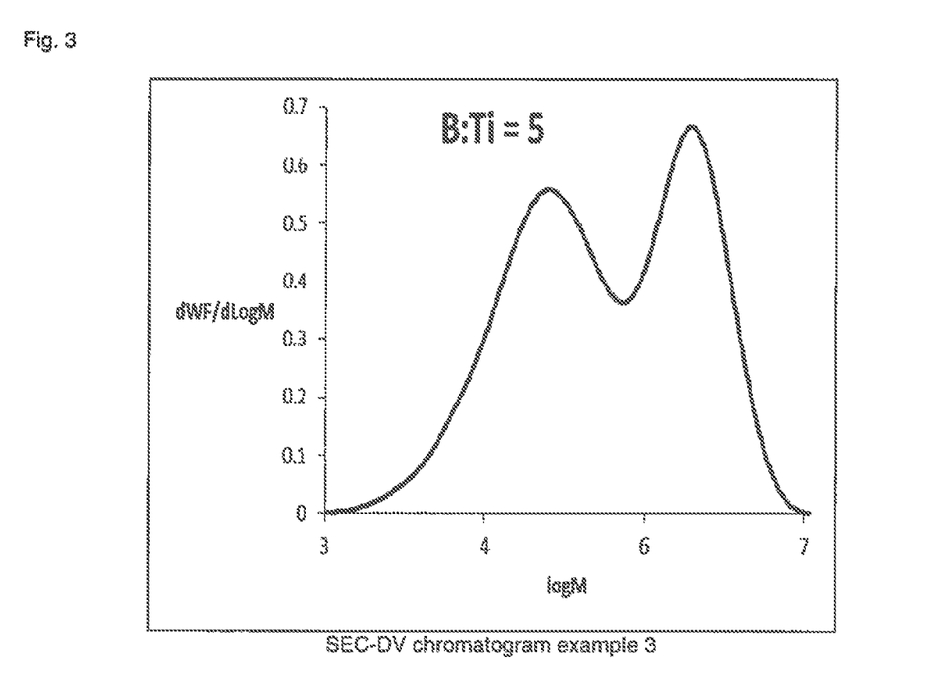
Figure 4:
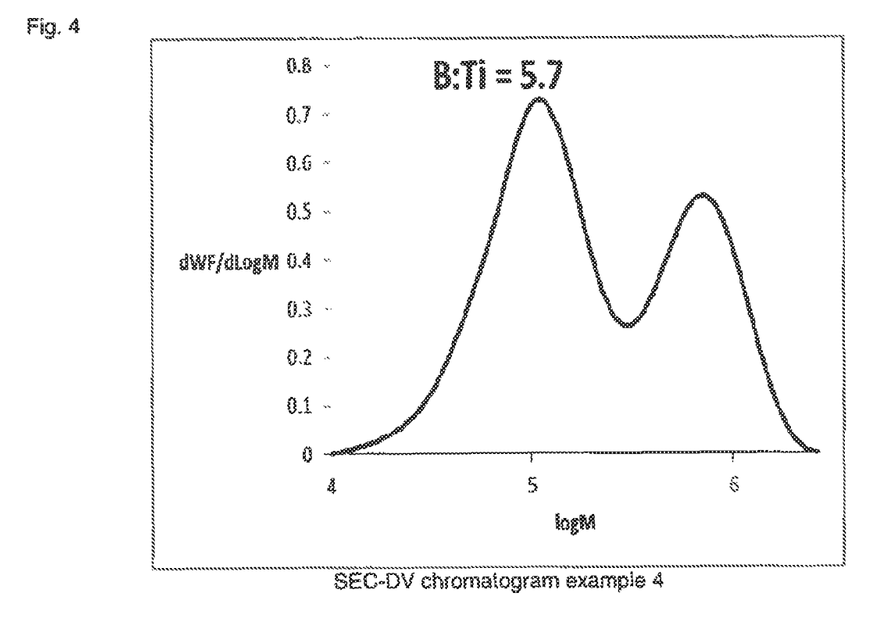

What is claimed is:
1. A catalyst system comprising:
 a) a metal complex of the formula CyLMZ$_p$, wherein:
  M is a group 4 metal,
  Z is an anionic ligand,
  p is 1 or 2,
  Cy is a cyclopentadienyl-type ligand, and
  L is a guanidinate ligand of the formula wherein each A is independently selected from the group consisting of nitrogen and phosphorus, and R$^1$, R$^2$, R$^3$, and R$^4$ are independently selected from the group consisting of hydrogen, unsubstituted or substituted hydrocarbyl, unsubstituted or substituted silyl, and unsubstituted or substituted germyl residues, and
 b) a boron containing activator,
 wherein a molar ratio of boron of the boron containing activator to M of the metal complex is greater than 2.5.
2. The catalyst system according to claim 1, wherein the A is nitrogen.
3. The catalyst system according to claim 1, wherein R$^1$, R$^2$, R$^3$ and R$^4$ are independently selected from the group consisting of hydrogen and hydrocarbyl.
4. The catalyst system according to claim 1, wherein R$^1$, R$^2$, R$^3$ and R$^4$ are independently C$_1$-C$_4$-alkyl.
5. The catalyst system according to claim 1 wherein M is selected from the group consisting of Ti, Hf and Zr.
6. The catalyst system according to claim 1, wherein Z independently represents a halogen atom, a C$_{1-10}$ alkyl group, a C$_{7-20}$ aralkyl group, a C$_{6-20}$ aryl group, or a C$_{1-20}$ hydrocarbon-substituted amino.
7. The catalyst system according to claim 1, wherein:
 M is Ti,
 Z is selected from the group consisting of chlorine and C$_1$-C$_4$-alkyl,
 Cy is a 1,2,3,4,5-pentamethylcyclopentadienyl ligand, and
 L means 1,1,3,3-tetramethylguanidinate.
8. The catalyst system according to claim 1, wherein the boron containing activator is selected from the group consisting of triphenylmethyl tetrakis(pentafluorophenyl)borate, triphenylmethyl tetrakis(2,3,5,6-tetrafluorophenyl)borate, triphenylmethyl tetrakis (2,3,4,5-tetrafluorophenyl)borate, triphenylmethyl tetrakis(3, 4,5-trifluorophenyl)borate, triphenylmethyl tetrakis(2,3,4-trifluorophenynl)borate triphenylmethyl phenyltris(pentafluorophenyl) borate and triphenylmethyl tetrakis(3,5-bistrifluoromethylphenyl)borate.
9. A process for the preparation of a polymer by polymerizing at least one olefinic monomer, the process comprising contacting the at least one olefin monomer with a catalyst system according to the claim 1.
10. A process for the preparation of a polymer according to claim 9, wherein the polymer has a molecular weight distribution MWD of greater than 3.5.
11. A process according to claim 9 wherein the at least one olefinic monomer comprises ethylene and at least one other C$_3$-C$_{12}$-α-olefin.
12. A process according to claim 9, wherein the at least one olefinic monomer comprises ethylene, ethylene, at least one C$_3$-C$_{12}$-α-olefin and at least one non-conjugated diene.
13. The catalyst system according to claim 1, wherein:
 M is selected from the group consisting of Ti, Hf and Zr,
 Z is a halogen atom, a C$_{1-10}$ alkyl group, a C$_{7-20}$ aralkyl group, a C$_{6-20}$ aryl group, or a C$_{1-20}$ hydrocarbon-substituted amino,
 Cy is an unsubstituted, mono- or polysubstituted cyclopentadienyl ligand, a mono- or polysubstituted indenyl ligand, or a mono- or polysubstituted fluorenyl ligand, wherein the substituents are selected from the group consisting of halogen, substituted or unsubstituted hydrocarbyl radicals, substituted or unsubstituted hydrocarbyloxy radicals, substituted or unsubstituted silyl residues, substituted or unsubstituted germyl residues, amide radicals, and phosphido radicals, $R^1$, $R^2$, $R^3$ and $R^4$ are independently selected from the group consisting of hydrogen and hydrocarbyl, and the boron containing activator is selected from the group consisting of (C1) boron compounds represented by the general formula $BQ_1Q_2Q_3$ and comprising tris(pentafluorophenyl)borane, tris(2,3,5,6-tetrafluorophehyl)borane, tris(2,3,4,5-tetrafluorophenyl)borane, tris(3,4,5trifluorophenyl)borane, tris(2,3,4-trifluorophenyl)borane, and phenylbis(pentafluoro-phenyl)borane, (C2) boron compounds represented by the general formula $G(BQ_1Q_2Q_3Q_4)$, wherein G is a carbenium cation, and $(BQ_1Q_2Q_3Q_4)$ comprises tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, teterakis(2,3,4-trifluorophenyl)borate, phenyltris(pentafluoro-phenyl)borate, and tetrakis(3,5-bistrifluoromethylphenyl)borate, and (C3) boron compounds represented by the general formula $(J-H)(BQ_1Q_2Q_3Q_4)$, wherein $(BQ_1Q_2Q_3Q_4)$ are as in (C2), and (J-H) is a Bronsted acid comprising trialkyl-substituted ammonium, N,N-dialkylanilinium, dialkylammonium, and triaryl phosphonium.

14. The catalyst system according to claim 13, wherein:

p is 2, each Z is independently a halogen atom, a $C_{1-10}$ alkyl group, a $C_{7-20}$ aralkyl group, or a $C_{6-20}$ aryl group, or a $C_{1-20}$ hydrocarbon-substituted amino, Cy is a substituted or unsubstituted cyclopentadienyl ligand, substituted or unsubstituted indenyl ligand, substituted or unsubstituted fluorenyl ligand, substituted or unsubstituted tetrahydroindenyl ligand, substituted or unsubstituted tetrahydrofluorenyl ligand, substituted or unsubstituted octahydrofluorenyl ligand, substituted or unsubstituted benzoindenyl ligand, substituted or unsubstituted heterocyclopentadienyl ligand, substituted or unsubstituted heteroindenyl ligand, substituted or unsubstituted heterofluorenyl ligand, or isomers thereof, A is nitrogen, $R^1$, $R^2$, $R^3$ and $R^4$ are independently $C_1$-$C_4$-alkyl and the boron containing activator is selected from the group consisting of triphenylmethyl tetrakis(pentafluorophenyl)borate, triphenylmethyl tetrakis(2,3,5,6-tetrafluorophenyl)borate, triphenylmethyl tetrakis(2,3,4,5-tetrafluorophenyl)borate, triphenylmethyl tetrakis(3,4,5-trifluorophenyl)borate, triphenylmethyl tetrakis(2,3,4-trifluorophenyl)borate, triphenylmethyl phenyltris(pentafluorophenyl)borate and triphenylmethyl tetrakis(3,5-bistrifluoromethylphenyl)borate.

15. The catalyst system according to claim 14, wherein;

M is Ti,

Z is chlorine and methyl,

Cy is a 1,2,3,4,5-pentamethylcyclopentadienyl ligand, $R^1$, $R^2$, $R^3$, and $R^4$ are each methyl and L means 1,1,3,3-tetramethylguanidate, and the boron containing activator is triphenylmethyl tetrakis(pentafluorophenyl)borate.

16. The catalyst system according to claim 15, further comprising a support material, supporting at least the metal complex of the formula $CyLMZ_p$.

17. The catalyst system according to claim 16, wherein the support material comprises silica, $MgF_2$, $MgCl_2$, $MgBr_2$, $MgI_2$, zeolites, alumina, polyolefins, polystryrene, polypropylene, polyethylene, polycondensates, polyamides, polyesters or combinations thereof.

* * * * *